Jan. 10, 1928.

G. WILLENS 1,656,029

ADVERTISING DEVICE

Filed Feb. 18, 1926

Inventor:
George Willens,
By Hugh H. Wagner
Attorney.

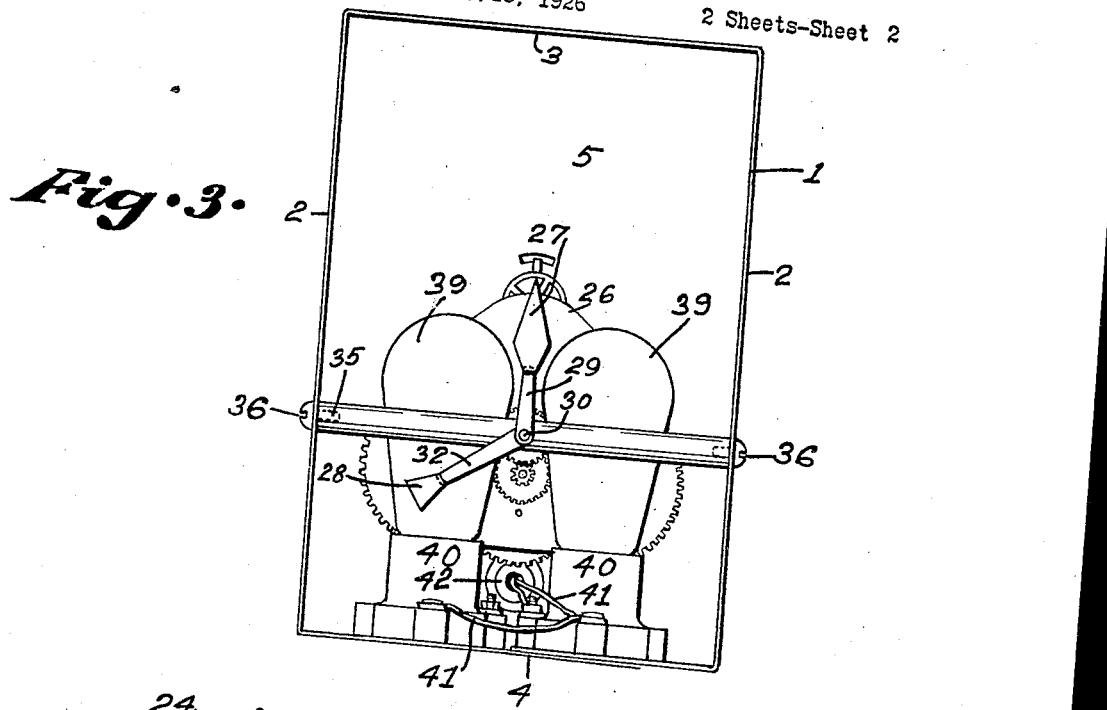

Patented Jan. 10, 1928.

1,656,029

UNITED STATES PATENT OFFICE.

GEORGE WILLENS, OF CHICAGO, ILLINOIS.

ADVERTISING DEVICE.

Application filed February 18, 1926. Serial No. 89,052.

This invention relates to advertising devices and to illuminated intelligence-conveying devices generally, and has more particular reference to a clock bearing advertising or other informative matter on a light-permeable face and indicating the time by means of the images of the hands or pointers located within the clock, the said images being projected on the said face by a source of illumination located within the clock.

In prior devices of this character, the hands and the advertising matter were arranged on slides located within the box and their images projected on the light-permeable face or screen of the clock by means of lenses or mirrors. The cost of the lenses and the parts associated therewith in these devices is a consideratum.

Accordingly, one of the objects of the present invention is the provision of a device of the character described in which lenses and their associated parts will be unnecessary, thus materially reducing the cost of construction of the device.

Another object is to provide means whereby the advertising matter displayed by the device may be imprinted on paper or other inexpensive flexible sheet material, thereby eliminating the use of expensive glass slides hitherto employed for this purpose.

Another object is the provision of a quickly detachable means for securing the paper or flexible sheet in position in the device, thus facilitating its removal or replacement.

Another purpose of the invention is to provide a screen holding frame that forms a removable face or cover for an open side of the box, and which may be readily attached or detached therefrom.

Other objects and advantages will be apparent as the description proceeds.

In the accompanying drawings forming part of this specification, in which like numbers of reference denote like parts wherever they occur, Figure 1 is a vertical sectional view taken on the line 1—1 in Figure 2;

Figure 3 is a view of the interior of the clock, the front cover or panel having been removed; and Figure 4 is a vertical sectional view taken on the line 4—4 in Figure 1.

Figure 1:
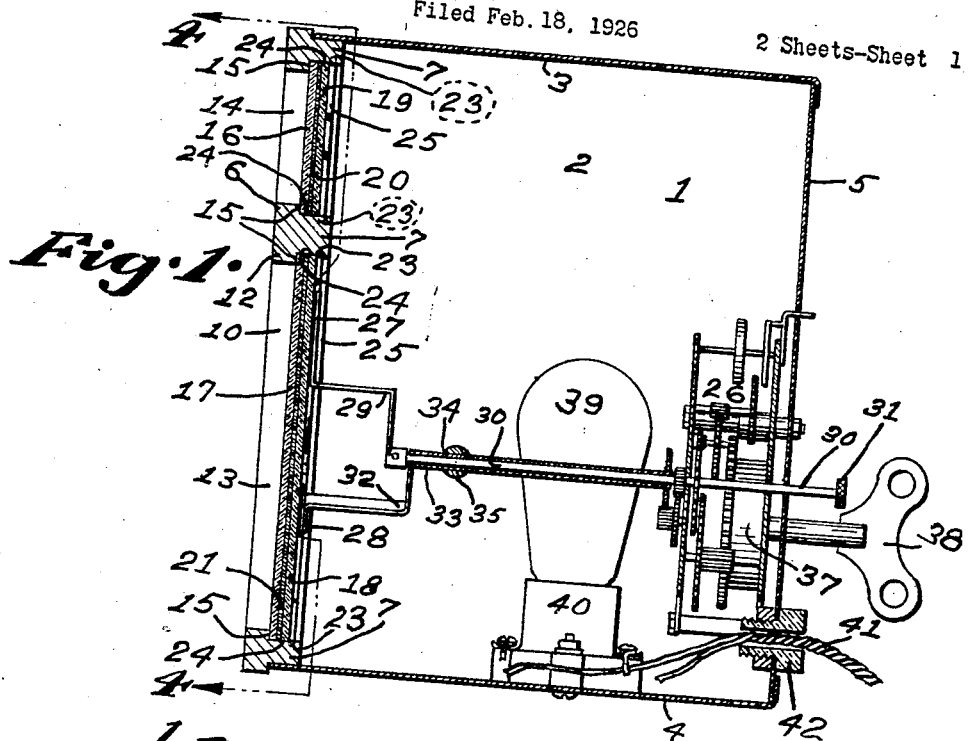
Figure 2:
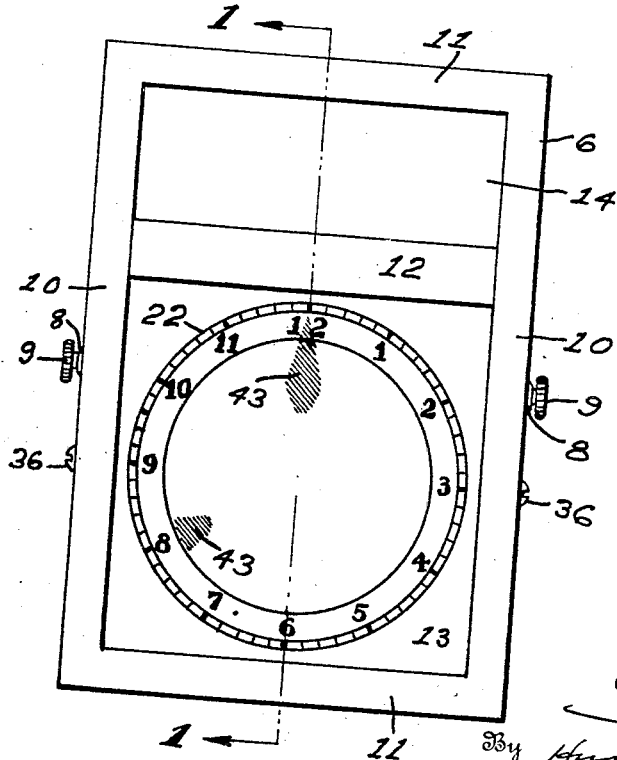
Figure 2 is a front elevation of the device.

An enclosing member 1 of a preferably rectangular boxlike formation, comprises opaque lateral walls 2, top wall 3, bottom wall 4 and posterior wall 5. The said walls are preferably formed of sheet metal and the open anterior side is covered by a removable panel or marginal frame 6, substantially T-shaped in cross-section and having portions or flanges 7 retracted from the marginal edges of the frame and projecting inwardly and engaging the inner sides of the walls 2, 3 and 4. Screws 8, having knurled heads 9, pass through perforations in the walls 2 and thread into tapped openings in the flanges 7. The screws 8 secure the panel 6 to the box 1; and the screws may be easily removed if detachment of the frame or cover 6 is desired.

The vertically extended portions 10 of the frame 6, in addition to being connected at their upper and lower ends to respective horizontally extended portions 11, are preferably joined intermediately of their height by a third horizontally extended portion 12, forming a substantially square lower opening 13 and a horizontally elongated upper opening 14 in the frame 6. Shoulders or seats 15, formed around the margins of the openings 13 and 14, and facing the interior of the box, support respective screens in the openings 13 and 14 against outward displacement. Each of the screens preferably comprises an outer pane of glass, an inner pane of glass, and an intermediate sheet of paper or other flexible sheet material. The upper and lower outer panes 16 and 17, respectively, are preferably transparent, as is the inner pane 18 of the lower opening. The inner pane 19 of the upper opening is preferably colored. The upper intermediate sheet 20 and the lower intermediate sheet 21 are preferably translucent and may bear advertising matter or have other information imprinted thereon. Or, instead of a single sheet that is both translucent and imprinted, two sheets superimposed on one another may be employed, one, for instance, being a transparent sheet of image or character-bearing celluloid, and the other a translucent sheet of paper. A representation of a clock dial 22 is borne by the lower sheet 21; and advertising matter may be borne by the upper sheet 20, and by that portion of the sheet 21 not covered by the dial. Notches 23 are formed in the inner or opening-facing sides 24 of the flanges 7, and lie in a plane located immediately beyond the inner panes 18 and 19. A removable resilient member 25, preferably a loop of wire, abuts against the inner side of the inner pane 18 and normally tends to expand into the notches 23 adjacent thereto. Wire member 25 prevents inward displacement of the pane 18. Two such wire members 25 are provided to retain the upper pane 19 against inward displacement. To remove the several plates or panes and the intermediate sheets, it is merely necessary to compress the loops 25 to reduce their diameter, thereby permitting disengagement of the loops 25 with their respective notches 23, and the subsequent removal of the loops and the said plates and sheets.

A source of motive power or clock mechanism 26 of any common or well known form is located in the posterior portion of the box 1, being preferably secured to the posterior wall 5. A minute hand 27 and an hour hand 28 are adapted to move over the pane 18, being very close thereto or substantially superimposed thereon. Minute hand or pointer 27 secured through the intermediacy of its L-shaped arm 29 to the shaft or stem 30, extending through the clock mechanism and the rear wall 5 and provided with a knurled head 31 for setting the hands. Hour hand or pointer 28 is secured through the intermediacy of its L-shaped arm 32 to the hollow stem or sleeve 33, enclosing the stem 30, and passing at its forward end through a bearing 34 in a rod or support 35, extending from one to the other of the walls 2 and secured thereto by means of screws 36. Sleeve 33 is geared to stem 30, and stem 30 is driven by the clock mechanism 26, the spring 37 of which may be wound by a key 38. Electric lamps 39, disposed intermediately of the clock mechanism 26 and the pointers 27 and 28 and on opposite sides of the stem 30, are held in sockets or base fittings 40, secured to the floor 4 of the box 1. The lamps are connected to any convenient outlet of an electric circuit through a flexible electric cord 41, connected to the sockets 40 and passing through an insulating sleeve 42 in the rear wall 5. The other end of the cord 41 is, of course, provided with a suitable plug adapted to fit the outlet of an electric circuit.

The pointers 27 and 28, lying practically against the pane 18, project distinct shadows or images 43 on the translucent sheet 21; while the arms 29 and 32, the stems 30 and 33 and the rod 35, being more remote from the sheet 21, form no images thereon. The lamps 39, being disposed on opposite sides of the stem 30, insure equal distribution of illumination on both sides of the stem, so that the only images projected on the translucent screen are those of the light-intercepting bodies or pointers 27 and 28.

Having thus fully described this invention, I hereby reserve the benefit of all changes in form, arrangement, order, or use of parts, as it is evident that many minor changes may be made therein without departing from the spirit of this invention or the scope of the following claim.

I claim:

In a device of the character described, a casing presenting an open front portion, a rabbetted frame removably positioned in said open portion, a pair of spaced transparent screens mounted in said frame, a sheet interposed between said screens and having indicia thereon, said frame being further provided with a plurality of notches on its inner faces lying in a plane located immediately beyond the inner face of the inner screen and a resilient member adapted to fit into said notches to secure said screens in said frame, said member being substantially circular and adapted to be compressed for the removal of said screens.

In testimony whereof I hereunto affix my signature.

GEORGE WILLENS.